(12) United States Patent
Park

(10) Patent No.: US 7,372,771 B2
(45) Date of Patent: May 13, 2008

(54) ELECTRONIC DISTANCE MEASURING APPARATUS

(76) Inventor: In-Kyu Park, 421-308, Jukong Apt., Dungchon-Dong, Kangdong-Ku, Seoul 134-774 (KR)

(*) Notice: Subject to any disclaimer, the term of this patent is extended or adjusted under 35 U.S.C. 154(b) by 0 days.

(21) Appl. No.: 11/570,124

(22) PCT Filed: Jun. 15, 2005

(86) PCT No.: PCT/KR2005/001832

§ 371 (c)(1), (2), (4) Date: Dec. 6, 2006

(87) PCT Pub. No.: WO2005/124389

PCT Pub. Date: Dec. 29, 2005

(65) Prior Publication Data

US 2007/0177155 A1 Aug. 2, 2007

(30) Foreign Application Priority Data

Jun. 15, 2004 (KR) .................... 10-2004-0043931

(51) Int. Cl.
*G01S 13/06* (2006.01)
*G01B 7/02* (2006.01)
*G01B 11/02* (2006.01)
*G01B 17/00* (2006.01)

(52) U.S. Cl. .................... 367/99; 367/128
(58) Field of Classification Search ............ 367/99, 367/128; 356/502; 33/1 G, 784, 277; 702/164, 702/159
See application file for complete search history.

(56) References Cited

U.S. PATENT DOCUMENTS

| | | | | |
|---|---|---|---|---|
| 4,574,368 A | * | 3/1986 | Lipschutz | 367/108 |
| 4,695,161 A | | 9/1987 | Reed | |
| 5,287,627 A | * | 2/1994 | Rando | 367/99 |
| 5,493,786 A | * | 2/1996 | Thomson | 33/1 G |
| RE36,257 E | * | 7/1999 | Thomson | 33/1 G |
| 6,157,591 A | | 12/2000 | Krantz | |
| 6,560,560 B1 | * | 5/2003 | Tachner | 702/164 |
| 7,086,162 B2 | * | 8/2006 | Tyroler | 33/1 G |
| 2006/0002233 A1 | * | 1/2006 | Malard | 367/128 |
| 2007/0177155 A1 | * | 8/2007 | Park | 356/502 |

FOREIGN PATENT DOCUMENTS

| | | |
|---|---|---|
| DE | 19818460 | 10/1999 |
| DE | 10006652 | 8/2000 |
| GB | 2170907 | 8/1986 |
| JP | 63-144210 | 6/1988 |
| JP | 08-226820 | 9/1996 |
| WO | WO 2005124389 A1 * | 12/2005 |

\* cited by examiner

*Primary Examiner*—Dan Pihulic
(74) *Attorney, Agent, or Firm*—IPLA P.A.; James E. Bame

(57) ABSTRACT

A portable and convenient electronic distance measuring apparatus using a laser beam and a supersonic wave is provided. A predetermined height is measured using a supersonic sensor and a laser pointer is rotated at the predetermined height to radiate a laser beam at a target object so that a distance to a target object at which that laser beam is pointing can be accurately measured using a resistance value corresponding to a rotation angle of the laser pointer

12 Claims, 9 Drawing Sheets

ELECTRONIC DISTANCE MEASURING APPARATUS

TECHNICAL FIELD

The present invention relates to a distance measuring apparatus, and more particularly, to an electronic distance measuring apparatus using a laser beam and a supersonic wave.

BACKGROUND ART

A laser is an apparatus which amplifies or oscillates an electromagnetic wave having a very short wavelength using quantum mechanics. The laser is referred to as a quantum oscillator or a molecular oscillator. The term "laser" is originated from Light Amplification by Stimulated Emission of Radiation.

Light emited when an object is burned or light emitted from a fluorescent lamp is generated from individual atoms or molecules heated at high temperature. Such light has a large number of different wavelengths even if the light is generated from the same kind of atoms or molecules. Light generated from individual atoms or molecules is the group of diverse lights having no relations with each other. However, a laser beam is coherent much more than other light beams and goes straight almost without diverging.

Such laser is wide spread in human life. A representative is a laser pointer which is an apparatus pointing at a direction by radiating a laser beam generated by a laser diode at a particulat position of a target object. The laser pointer is made compact so that a user can conveniently carry.

Meanwhile, in the industrial world including industrial sites, construction sites, and interiors and in daily life, a measuring tape is usually used to measure a distance. However, it is difficult for a user along to measure a size of a large object or place or a high object or place with the measuring tape. Moreover, since the measuring tape is easily bent or curved, it may be difficult to accomplish accurate measurement. To overcome this problem, a laser distance measuring apparatus, which counts time until an emitted laser beam returns back from a target object and measures a distance to the target object, has been developed.

Such laser distance measuring apparatus emits a laser beam, receives the laser beam reflected from a target object, and measure a distance to the target object. Accordingly, it is necessary to accurately receive the laser beam. However, when a user measures a distance while holding the laser distance measuring apparatus with the hand, it is difficult to receive a laser beam reflected from a target object if the laser beam is refracted and reflected by the target object.

DISCLOSURE OF THE INVENTION

The present invention provides an electronic distance measuring apparatus using a laser beam and a supersonic wave, by which a predetermined height is measured using a supersonic sensor, a laser pointer designed such that a resistance value varies with the rotation at the predetermined height is rotated to radiate a laser beam at a target object, and a distance to the target object is accurately measured using a resistance value corresponding to the rotation angle of the laser pointer, thereby facilitating portable use.

According to an aspect of the present invention, there is provided an apparatus for measuring a distance using a laser beam and a supersonic wave. The apparatus includes a supersonic transceiver generating and transmitting a supersonic wave according to a control signal received from an outside and receiving the supersonic wave reflected and returning back; a laser generation unit generating a laser beam according to a control signal received from the outside; a resistance varying unit sensing a rotation of the laser generation unit, varies a resistance value according to an amount of the rotation, and dividing a constant voltage output from a power supply unit; a voltage multiplication unit sensing a level of the constant voltage output from the resistance varying unit and multiplying the constant voltage by a predetermined number when the level of the constant voltage is less than a predetermined level; an analog-to-digital converter converting an analog signal received from each of the supersonic transceiver, the resistance varying unit, and the voltage multiplication unit into a digital signal; a button unit including a plurality of buttons for receiving a command from a user; a display unit displaying a measured distance; a speaker unit generating sound when a distance measured by the supersonic transceiver reaches a reference distance; a memory unit storing distance data corresponding to a voltage value output from each of the resistance varying unit and the voltage multiplication unit in a table form; and a control unit controlling the speaker unit to generate sound after checking that the reference distance has been reached based on a signal received from the supersonic transceiver via the analog-to-digital converter, reading from the memory unit distance data corresponding to signals received from the resistance varying unit and the voltage multiplication unit via the analog-to-digital converter, controlling the display unit to display the distance data.

BEST MODE FOR CARRYING OUT THE INVENTION

Hereinafter, embodiments of the present invention will be described in detail with reference to the attached drawings.

Figure 1:
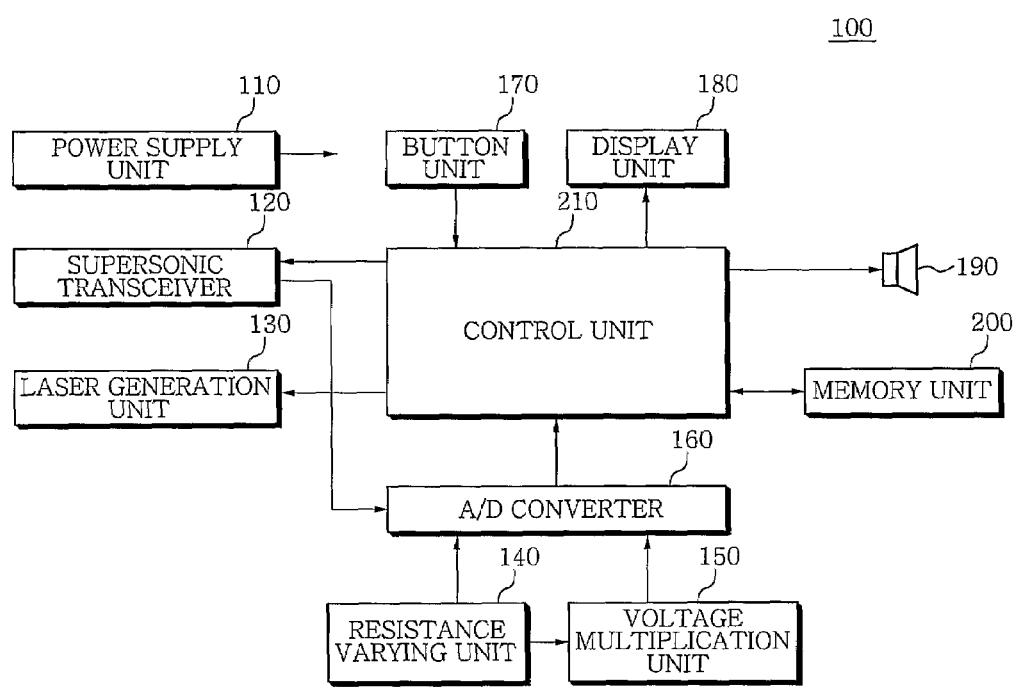
FIG. 1 is a block diagram of an electronic distance measuring apparatus using a laser beam and a supersonic wave according to an embodiment of the present invention.
Figure 2:
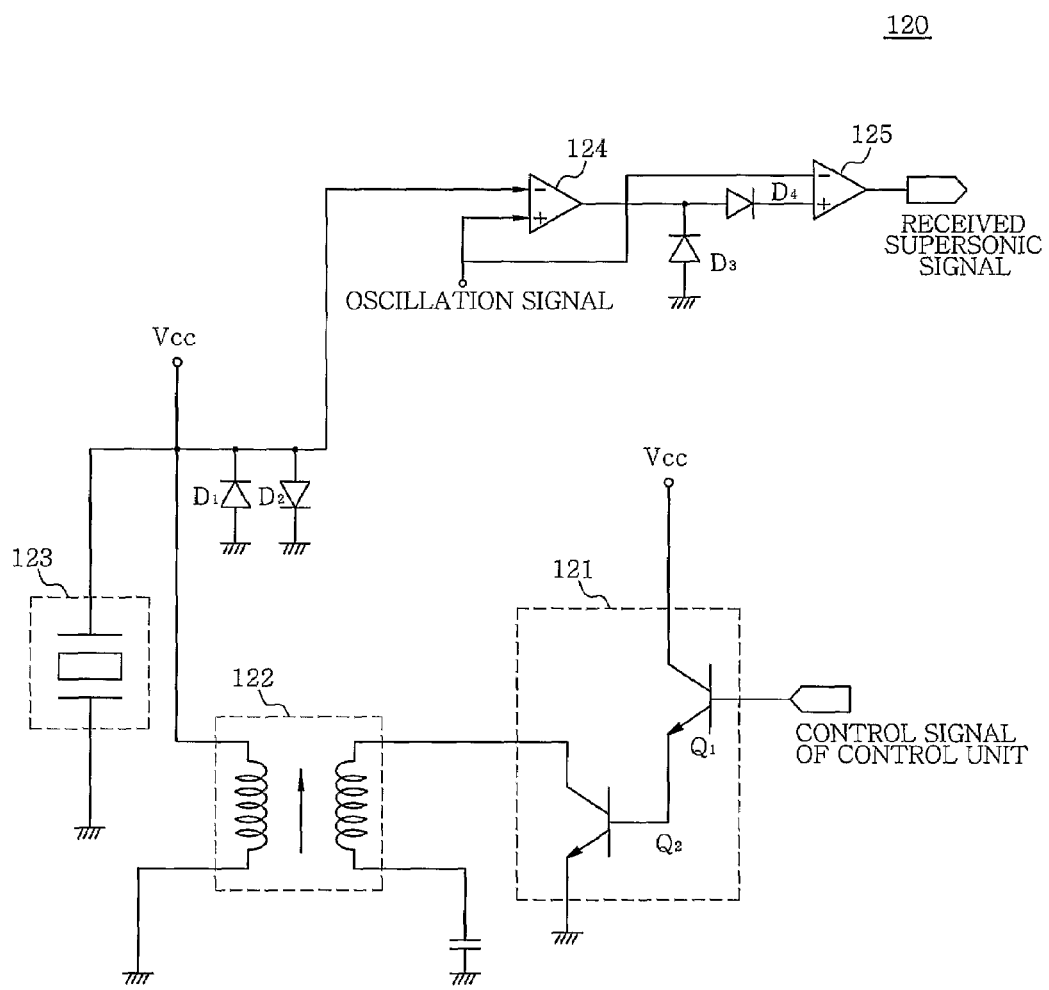
FIG. 2 is a circuit diagram of a supersonic transceiver in the electronic distance measuring apparatus according to the embodiment illustrated in FIG. 1.
Figure 3:
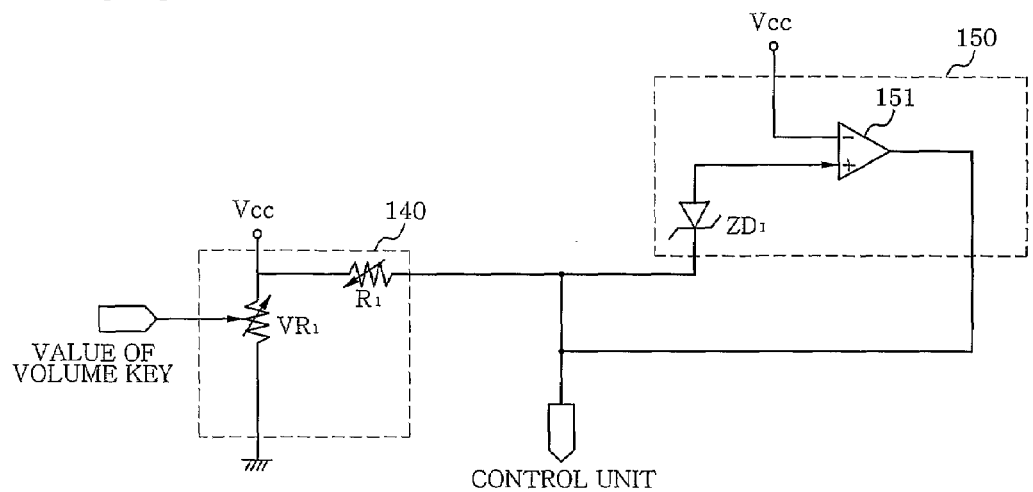
FIG. 3 is a circuit diagram of a resistance varying unit and a voltage multiplication unit in the electronic distance measuring apparatus according to the embodiment illustrated in FIG. 1.
Figure 4:
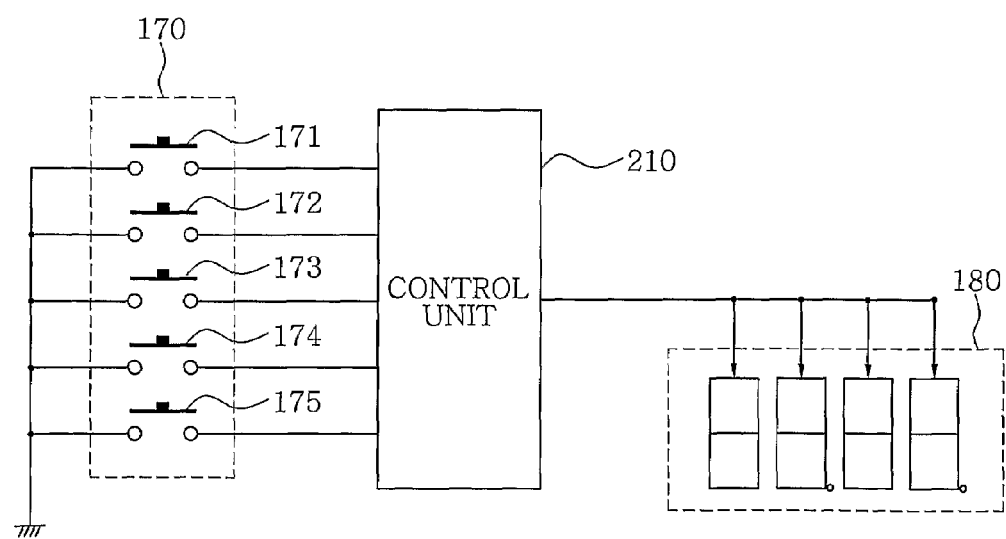
FIG. 4 is a circuit diagram of a button unit and a display unit in the electronic distance measuring apparatus according to the embodiment illustrated in FIG. 1.
Figure 5:
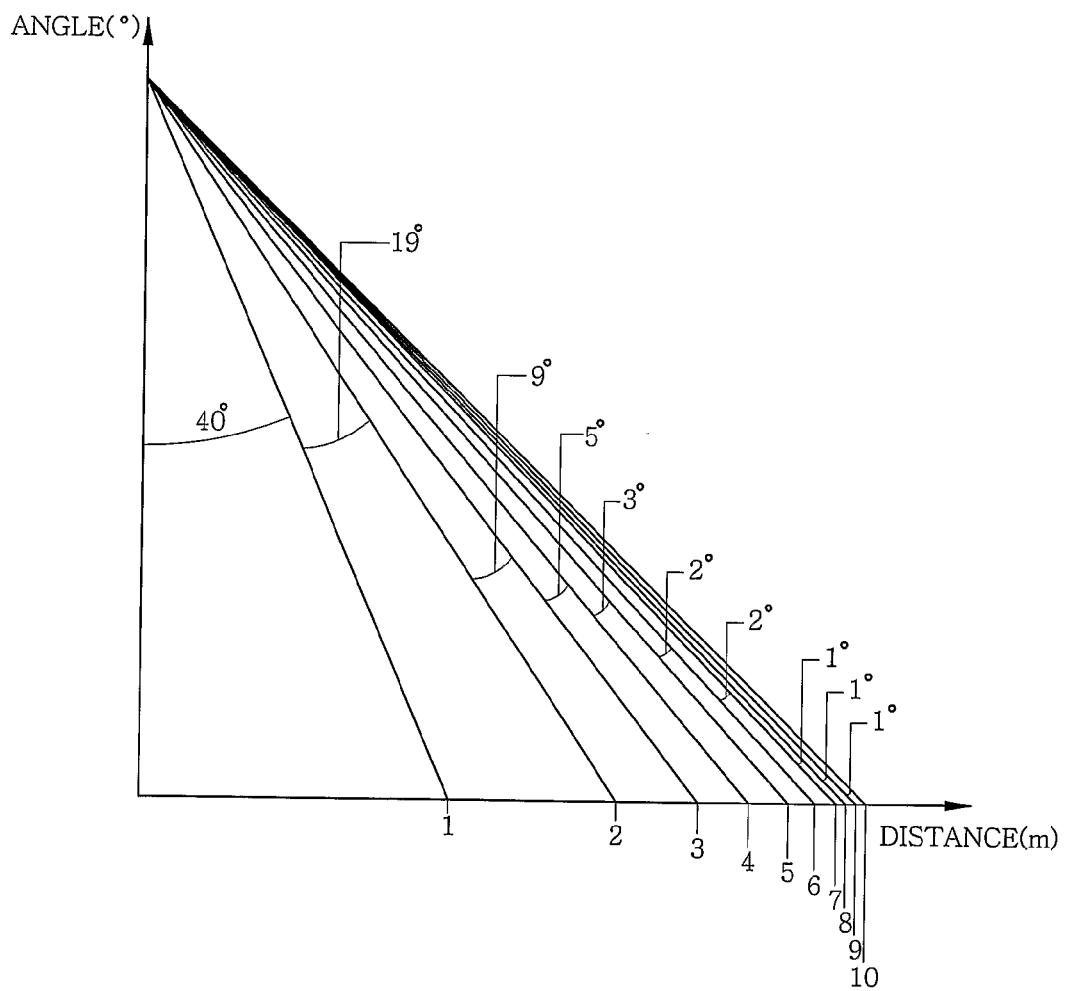
FIG. 5 is a graph illustrating a distance versus the rotation angle of a laser generation unit in the electronic distance measuring apparatus according to the embodiment illustrated in FIG. 1.

FIG. 1 is a block diagram of an electronic distance measuring apparatus using a laser beam and a supersonic wave according to an embodiment of the present invention. FIG. 2 is a circuit diagram of a supersonic transceiver in the electronic distance measuring apparatus according to the embodiment illustrated in FIG. 1. FIG. 3 is a circuit diagram of a resistance varying unit and a voltage multiplication unit in the electronic distance measuring apparatus according to the embodiment illustrated in FIG. 1. FIG. 4 is a circuit diagram of a button unit and a display unit in the electronic distance measuring apparatus according to the embodiment illustrated in FIG. 1. FIG. 5 is a graph illustrating a distance versus the rotation angle of a laser generation unit in the electronic distance measuring apparatus according to the embodiment illustrated in FIG. 1.

Referring to FIGS. 1 through 5, an electronic distance measuring apparatus 100 according to an embodiment of the present invention includes a power supply unit 110, a supersonic transceiver 120, a laser generation unit 130, a resistance varying unit 140, a voltage multiplication unit 150, an analog-to-digital (A/D) converter 160, a button unit 170, a display unit 180, a speaker unit 190, a memory unit 200, and a control unit 210.

The power supply unit 110 supplies electric power to each element of the electronic distance measuring apparatus 100. The power supply unit 110 may be implemented as a battery to make the electronic distance measuring apparatus 100 portable. The battery may be designed to be charged using commercial electric power. The structure of a charger is obvious, and thus a description thereof will be omitted.

Referring to FIG. 2, the supersonic transceiver 120 includes a driver 121, a tuning coil 122, a supersonic sensor 123, an amplifier 124, and a comparator 125.

The driver 121 switches a control signal of the control unit 210 to generate a driving signal. The driver 121 is implemented as two-staged amplifiers including a first transistor $Q_1$ and a second transistor $Q_2$. A pulse of the control signal of the control unit 210 is applied to a base of the first transistor $Q_1$, the first and second transistors $Q_1$ and $Q_2$ are switched and a frequency signal is generated. Alternatively, the driver 121 may include a switching unit such as a diode, a field effect transistor (FET), or a silicon controlled rectifier (SCR).

The tuning coil 122 includes a primary coil connected to a collector of the second transistor $Q_2$ and a secondary coil connected to the supersonic sensor 123 so that the driving signal, i.e., the frequency signal received via the second transistor $Q_2$ of the driver 121 is turned and then output to the supersonic sensor 123. An intermediate frequency transformer (IFT) coil may be used as the tuning coil 122.

The supersonic sensor 123 oscillates in response to the driving signal output from the secondary coil of the tuning coil 122, generates and radiates a supersonic wave, and receives the supersonic wave reflected by an object. Here, the supersonic sensor 123 detects a distance using time taken for a supersonic wave radiated from a transmitter of an oscillator using a piezo-electric device to reach a receiver of the oscillator after being reflected. In other words, the supersonic sensor 123 generates a supersonic wave for a predetermined period of time, detects a signal turning back after being reflected by a target object, and measures a distance to the target object using a time difference between the generation and the detection. To measure the time from the generation and the returning back of the supersonic wave, the control unit 210 starts counting when the supersonic wave is generated and stops counting when the returning supersonic wave is detected. A count value is read to calculate the time and a distance is measured using the calculated time.

Meanwhile, a first diode $D_1$ and a second diode $D_2$ are connected to an input terminal of the supersonic sensor 123 in parallel in a reverse direction and a forward direction, respectively, to clip the level of a supersonic signal input to the supersonic sensor 123.

The amplifier 124 has a non-inverting terminal (+) connected to an output terminal of the supersonic sensor 123 and an inverting terminal (−) connected to the control unit 210 and amplifies and outputs the supersonic signal received from the supersonic sensor 123. The amplifier 124 may be implemented as muti-stage amplifiers when necessary. A third diode $D_3$ is connected to an output terminal of the amplifier 124 in parallel in a reverse direction and a fourth diode $D_4$ is connected to the output terminal of the amplifier 124 in series in a forward direction to detect an output signal.

The comparator 125 has a non-inverting terminal (+) connected to the output terminal of the amplifier 124 and an inverting terminal (−) connected to the control unit 210. The comparator 125 compares the supersonic signal output from the amplifier 124 with an oscillation signal output from the control unit 210 and outputs a signal corresponding to a difference therebetween.

The laser generation unit 130 is a laser pointer generating a laser beam using a laser diode (not shown) and is controlled by the control unit 210 to generate a laser beam. The laser generation unit 130 is installed on the same line and at the same angle as a volume key (not shown) of the resistance varying unit 140 such that a user can rotate the laser generation unit 130.

The resistance varying unit 140 changes a variable resistance value according to the rotation of the volume key. The volume key rotates 83° or less in an upward direction when it is vertical to the ground. The volume key is designed such that as a rotation angle of the volume key increases, a resistance value decreases. The rotation angle of the volume key is limited to 83° to put a laser beam within range (e.g., 10 m) of a user's eyes when a distance is measured. When the volume key rotates more than 83°, e.g., 84-85°, the range of a rotation angle is so small that a voltage level difference also becomes very small.

Referring to FIG. 3, the resistance varying unit 140 includes a variable resistor $VR_1$ and a semi-fixed resistor $R_1$ (or a fixed resistor when necessary), which are connected in parallel. The resistance varying unit 140 divides a constant voltage Vcc provided by the power supply unit 110 and outputs a divided voltage.

The voltage multiplication unit 150 includes a zener diode $ZD_1$ and a voltage multiplier 151, as shown in FIG. 3.

The zener diode $ZD_1$ has a cathode connected to a node connecting the resistance varying unit 140 and the control unit 210 and an anode connected to the voltage multiplier 151. The zener diode $ZD_1$ is turned ON when the voltage of the resistance varying unit 140 is greater than a breakdown voltage when the laser generation unit 130 rotates more than a predetermined angle (e.g., 80°) because a distance to be measured is farther than a predetermined distance.

The voltage multiplier 151 has a non-inverting terminal (+) connected to the anode of the zener diode $ZD_1$ and an inverting terminal (−) connected to the power supply unit 110. The voltage multiplier 151 compares an input voltage with a reference voltage, multiplies a difference therebetween by "n", and outputs the result of the multiplication to the A/D converter 160.

In detail, when a distance to be measured is far, the laser generation unit 130 rotates a large angle. The rotation angle range of the laser generation unit 130 when measurement is performed beyond a predetermined distance, for example, when measurement performed at a distance of 7-10 m, is less than that when measurement is performed within the predetermined distance, e.g., 1-7 m. For example, referring to FIG. 5, the rotation angle range is 40° at a distance of 0-1 m, 19° at a distance 1-2 m, 9° at a distance 2-3 m, 5° at a distance 3-4 m, 3° at a distance 4-5 m, 2° at a distance 5-6 m, 2° at a distance 6-7 m, 1° at a distance 7-8 m, 1° at a distance 8-9 m, and 1° at a distance 9-10 m. FIG. 5 is a graph illustrating a distance versus the rotation angle of the laser generation unit 130 in the electronic distance measuring apparatus 100 according to the embodiment illustrated in FIG. 1.

Since the resistance value of the resistance varying unit 140 is big at a short distance, the level of a divided voltage is low, and therefore, the control unit 210 can recognize the divided voltage. However, since the resistance value of the resistance varying unit 140 is small at a long distance, the level of the divided voltage becomes greater than a level (about 3V) that can be recognized by the control unit 210. Accordingly, this high level of the voltage is lowered below a predetermined level using the characteristic of the zener diode $ZD_1$ and then the voltage is multiplied using the voltage multiplier 151 to output the voltage with a longer interval so that the control unit 210 can recognizes the level of the voltage.

The A/D converter 160 converts an analog signal received from the comparator 125 of the supersonic transceiver 120 and an analog signal received from the resistance varying unit 140 or the voltage multiplier 151 of the voltage multiplication unit 150 into digital signals.

Referring to FIG. 4, the button unit 170 includes a power button 171 for turning ON or OFF power needed to generate a signal corresponding to a command, a unit conversion button 172 for converting centimeter unit to foot unit and vice versa, a measuring button 173 for measuring a distance, a laser ON/OFF button 174 for turning ON or OFF the laser generation unit 130, and a selection button 175 for selecting a laser beam or a supersonic wave.

The display unit 180 displays a distance in response to control of the control unit 210. The display unit 180 includes a four digit display windows and dots at the bottom middle and end points, respectively, to display a distance down to the centimeter place. For example, when the distance is 10 m, the display unit 180 displays "10.00.".

The speaker unit 190 generates sound when the supersonic sensor 123 of the supersonic transceiver 120 reaches a reference height (or distance) according to a control signal of the control unit 210. The reference height (or distance) may be set to a height, e.g., 1.1-1.3 m, at which a user can easily use the electronic distance measuring apparatus 100 while carrying it. The preferred reference height is about 1.2 m corresponding to a height of the user's hand when the user having an average stature raises the forearm at a right angle in a state where the arm is put straight on the user's side to be vertical to the ground.

The memory unit 200 stores various kinds of necessary information and stores distance data corresponding to a voltage value output from the resistance varying unit 140 and the voltage multiplication unit 150 in a table form. The distance data is expressed down to the centimeter place. In addition, the memory unit 200 stores variable data corresponding to a variable value used to convert the centimeter unit to the foot unit for display in a table form.

The memory unit also stores an algorithm of measuring a distance by calculating time for a supersonic wave to turn back based on a count value of the control unit 210.

The control unit 210 outputs a control signal to the driver 121 of the supersonic transceiver 120 so that the control the driver 121 and the tuning coil 122 generate a driving signal for the supersonic sensor 124 and thus the supersonic sensor 123 generates a supersonic wave.

When the supersonic sensor 123 receives a supersonic signal reflected by an object, the control unit 210 checks the height of the supersonic sensor 123 from the ground using a signal received from the comparator 125. When the supersonic sensor 123 is positioned at the reference height, the control unit 210 controls the speaker unit 190 to generate sound. Contrarily, when the supersonic sensor 123 is not positioned at the reference height, the control unit 210 does not make the speaker unit 190 generate sound.

In this situation, when the laser generation unit 130 rotates, the resistance value of the resistance varying unit 140 varies with the rotation angle, and a voltage value is received from the resistance varying unit 140 or the voltage multiplication unit 150 via the A/D converter 160, the control unit 210 searches the distance data in the memory unit 200 using the voltage value and controls the display unit 180 to display a searched distance.

When a level of a divided voltage from the resistance varying unit 140 is greater than a predetermined level, the control unit 210 controls the A/D converter 160 to interrupt an input from the resistance varying unit 140 and receive an input from the voltage multiplier 151 of the voltage multiplication unit 150.

When a user operates the unit conversion button 172 in the button unit 170, the control unit 210 searches the variable data in the memory unit 200 for a variable value, converts the centimeter unit to the foot unit, and displays a foot-unit value on the display unit 180.

Hereinafter, the operation of the electronic distance measuring apparatus 100 will be described in more detail.

Figure 6:
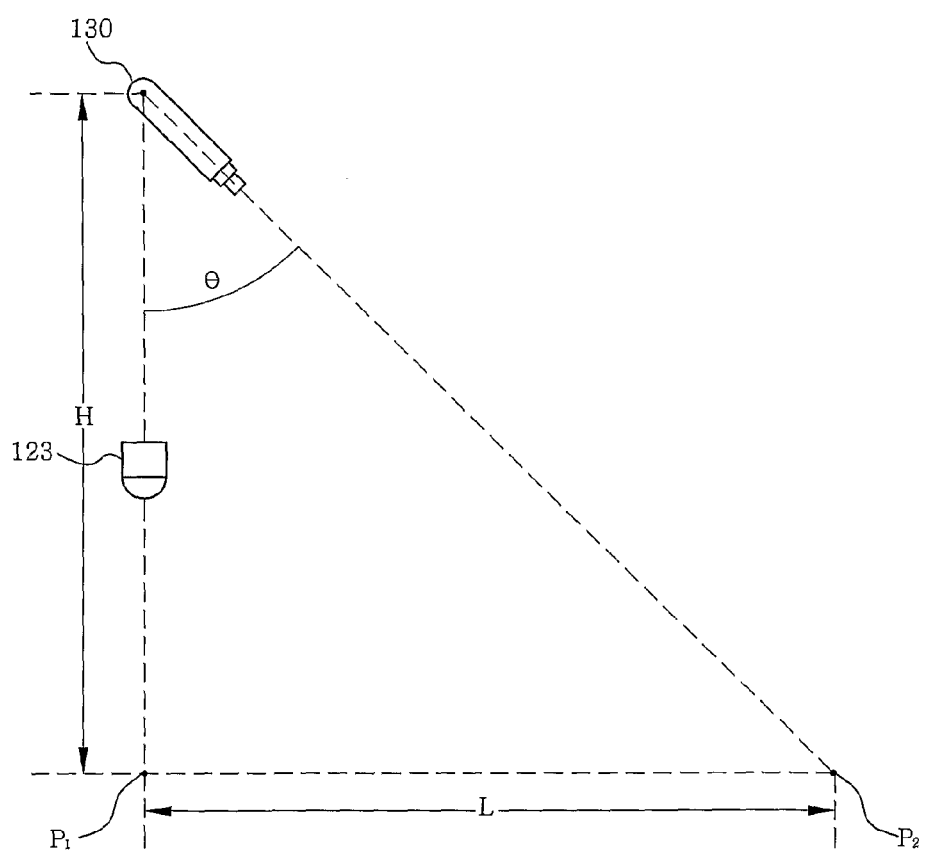
FIG. 6 illustrates the distance measuring principle using the electronic distance measuring apparatus according to the embodiment illustrated in FIG. 1.

FIG. 6 illustrates the distance measuring principle using the electronic distance measuring apparatus 100 according to the embodiment illustrated in FIG. 1.

Before setting forth the operation of the electronic distance measuring apparatus 100, the distance measuring principle using a triangle method will be described with reference to FIG. 6.

The supersonic sensor 123 is fixed such that a transmitter and a receiver are vertical to the ground. The rotation center of the laser generation unit 130 is on the same line as the supersonic sensor 123. The center of the volume key of the resistance varying unit 140 is connected to the rotation center of the laser generation unit 130 via an axis so that the laser generation unit 130 operates together with the volume key of the resistance varying unit 140. The volume key is initially set to a direction vertical to the ground.

In this state, a user operates the supersonic sensor 123, checks a distance, i.e., a height H from the ground, and maintains the height H constant. Here, the height H is standardized to 1.2 m and a distance from the supersonic sensor 123 to the volume key is compensated.

Next, the user rotates the laser generation unit 130 to make a laser beam pointing at a target position for distance measurement.

Then, a distance L to be measured corresponds to a distance between a ground position $P_2$ pointed at by the laser beam and a ground point $P_1$ of the electronic distance measuring apparatus 100.

Here, when a virtual straight line vertical to the ground is connected from the center of the supersonic sensor 123 to the rotation center of the laser generation unit 130 and an angle that the laser generation unit 130 rotates from the virtual straight line is represented with θ, Equation (1) is accomplished according to the definition of a trigonometric function.

$$\tan\theta = \frac{L}{H} \quad (1)$$
$$\therefore L = \tan\theta \times H$$

The distance L is calculated for each tanθ using Equation (1) and is stored in the memory unit 200. In the present invention, the resistance value of the resistance varying unit 140 varies with the amount of rotation of the laser generation unit 130 and thus a voltage value varies, and therefore, the value of tanθ is substantially a divided voltage value.

Figure 7:
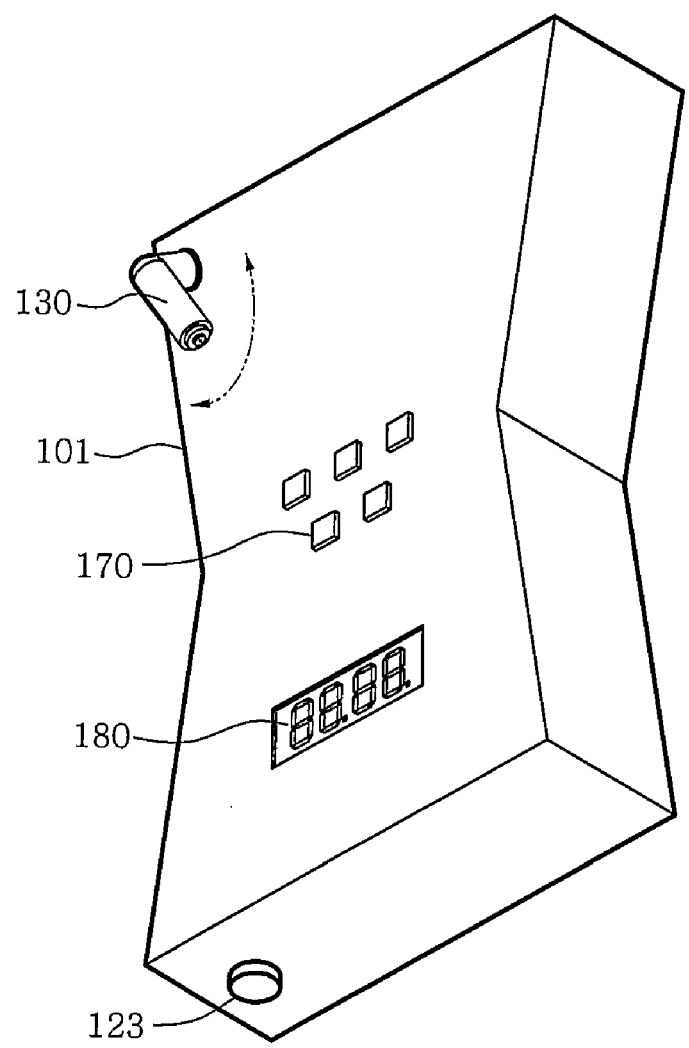
FIG. 7 is a perspective view of the appearance of the electronic distance measuring apparatus according to the embodiment illustrated in FIG. 1.

FIG. 7 is a perspective view of the appearance of the electronic distance measuring apparatus 100 according to the embodiment illustrated in FIG. 1.

A main body 101 of the electronic distance measuring apparatus 100 has a space (not shown) therewithin to accommodate the elements of the electronic distance measuring apparatus 100 and has a shape in which is narrow at the middle portion to allow a user to easily hold the electronic distance measuring apparatus 100 with one hand and becomes wider to the top and bottom. The laser generation unit 130 is installed at an upper side portion (i.e., an upper left portion in FIG. 7) of the main body 101 to rotate together with the volume key of the resistance varying unit 140. On the same side are installed the button unit 170 and the display unit 180 to allow the user to operate the laser generation unit 130 and the button unit 170 with one hand and to check a measured distance.

The supersonic sensor 123 is disposed on the bottom surface of the main body 101 such that the central line of the supersonic sensor 123 and the rotation center of the laser generation unit 130 are positioned on one straight line.

A balance checker (not shown) may be selectively provided on the right side surface of the main body 101 to check whether the main body 101 is parallel to the ground when the user measures a distance using only the supersonic sensor 123. The balance checker may be disposed on any side surface of the main body 101 but is preferably disposed on the right side surface to allow the user to easily check the balance during measurement. The balance checker may be implemented as a typical mechanical device using bubbles.

In the operation of the electronic distance measuring apparatus 100, a user presses the power button 171 in the button unit 170 to turn on power, presses the selection button 175 to select a supersonic wave, and raises the main body 101 with one hand to position the main body 101 so that the supersonic sensor 123 is vertical at a measuring position. Then, the control unit 210 controls the supersonic sensor 123 and checks a distance from the ground to the supersonic sensor 123 using a digital signal received from the comparator 125 via the A/D converter 160.

Here, as described above, the control unit 210 generates a supersonic wave and simultaneously starts counting.

Thereafter, when the supersonic wave returns back from a target object and a digital signal corresponding to the returning supersonic wave is received, the control unit 210 stops counting, reads a count value, and calculating a distance to the target object by calculating time taken for the supersonic wave to return using the count value.

When the distance from the ground to the supersonic sensor 123 is less or greater than a reference height (or distance), sound is not generated from the speaker unit 190.

When the sound is not generated from the speaker unit 190, the user vertically moves the main body up and down to adjust the supersonic sensor 123 to the reference height. When the supersonic sensor 123 reaches the reference height, the control unit 210 generates sound through the speaker unit 190. Here, the control unit 210 may control the speaker unit 190 to continuously generate sound when the supersonic sensor 123 reaches the reference height so that the user can recognize.

When the sound is generated from the speaker unit 190, the user fixes the electronic distance measuring apparatus 100 to the position where the sound is generated, presses the laser ON/OFF button 174 with the other hand that does not hold the main body 101 to generate a laser beam, ad rotates the laser generation unit 130 with the hand that does not hold the main body 101 to radiate the laser beam at the target object.

When the laser beam is exactly radiated at the target object, the user presses the measuring button 173 in the button unit 170.

Then, the control unit 210 checks the amount of rotation of the laser generation unit 130 with a divided voltage value received from the resistance varying unit 140 via the A/D converter 160. When the divided voltage value is greater than a predetermined level, the control unit 210 does not check the divided voltage value but checks a divided voltage value received from the voltage multiplication unit 150 via the A/D converter 160.

After checking the divided voltage value, the control unit 210 searches for a distance corresponding to the divided voltage value in a table stored in the memory unit 200 and controls the display unit 180 to display the searched distance in the centimeter unit.

When the distance is displayed on the display unit 180 in the centimeter unit, the user checks the displayed distance. If the user wants to change the centimeter unit to the foot unit, the user operates the unit conversion button 172 in the button unit 170.

Then, the control unit 210 searches a foot-unit value corresponding to the currently displayed centimeter-unit value in a table stored in the memory unit 200 and displays the searched foot-unit value on the display unit 180.

A method of using the electronic distance measuring apparatus 100 will be described in more detail with reference to FIG. 7.

To measure a distance, a user presses the power button 171 in the button unit 170 to turn on power and presses the selection button 175 in the button unit 170 to generate a supersonic wave. In this state, the user fixes the main body 101 with one hand so that the supersonic sensor 123 is vertically faces the ground.

Here, if sound is not generated through the speaker unit 190, the user vertically moves the main body 101 up and down and checks whether the sound is generated through the speaker unit 190.

At the moment when the sound is generated through the speaker unit 190 while the user is vertically moving the main body 101, the user fixes the main body 101 at a current position and presses the laser ON/OFF button 174 in the button unit 170 with the other hand that does not hold the main body 101 so that the laser generation unit 130 generates a laser beam.

Thereafter, the user rotates the laser generation unit 130 with the hand that does not hold the main body 101 so that the laser beam is radiated at a target object and then presses the measuring button 173 in the button unit 170.

Then, a distance to the target object is displayed on the display unit 180 in the centimeter unit and the user can recognize the distance through the display unit 180.

Alternatively, the user can measure the distance to the target object using a supersonic wave just by pressing the selection button 175 on the button unit 170 and operating only the supersonic transceiver 120. For example, a distance of 1.2 m can be easily measured using the supersonic sensor 123. In addition, a horizontal or vertical distance can be measured using only the supersonic transceiver 120 and displayed by the control of the control unit 210. The user can use the electronic distance measuring apparatus 100 as a laser pointer by pressing the selection button 175 in the button unit 170 so that a laser beam is generated by the laser generation unit 130.

Hereinafter, an electronic distance measuring apparatus 100A according to another embodiment of the present invention will be described with reference to FIGS. 8 through 11.

Figure 8:
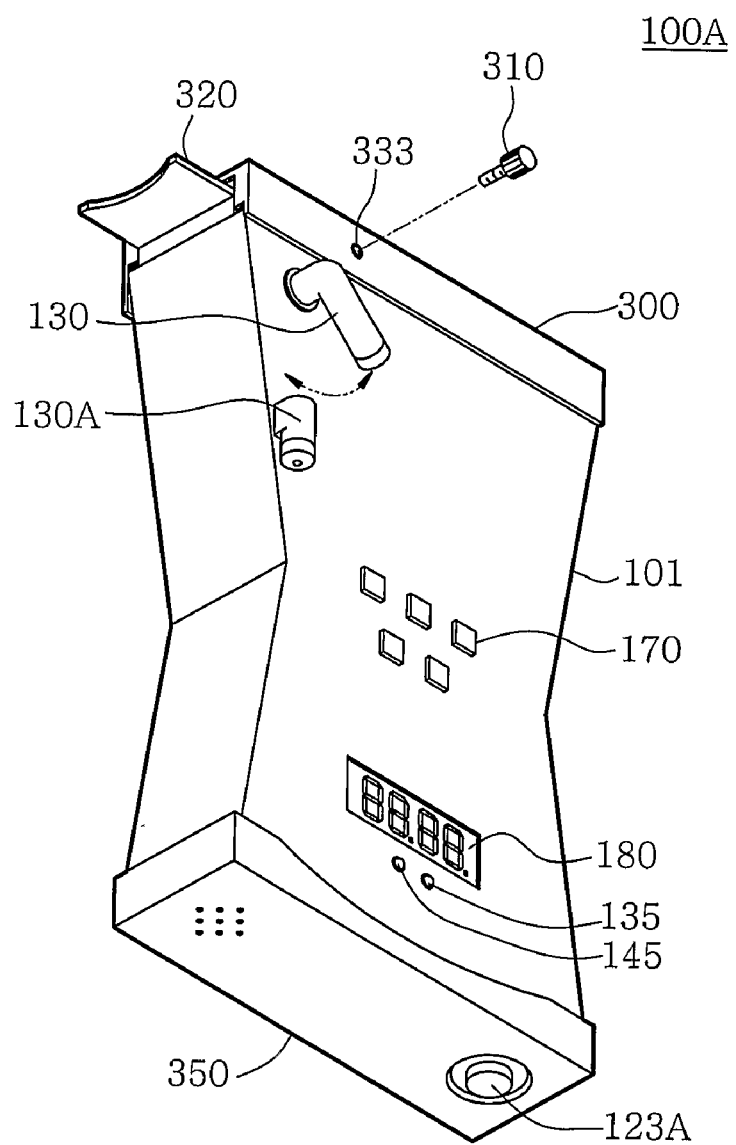
FIG. 8 is a perspective view of the appearance of an electronic distance measuring apparatus according to another embodiment of the present invention.
Figure 9:
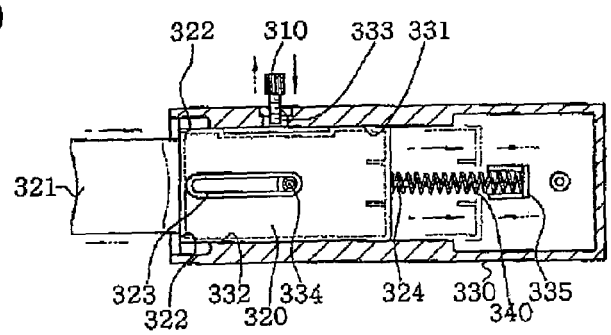
FIG. 9 illustrates an example of a balance adjusting structure shown in FIG. 8.
Figure 10:
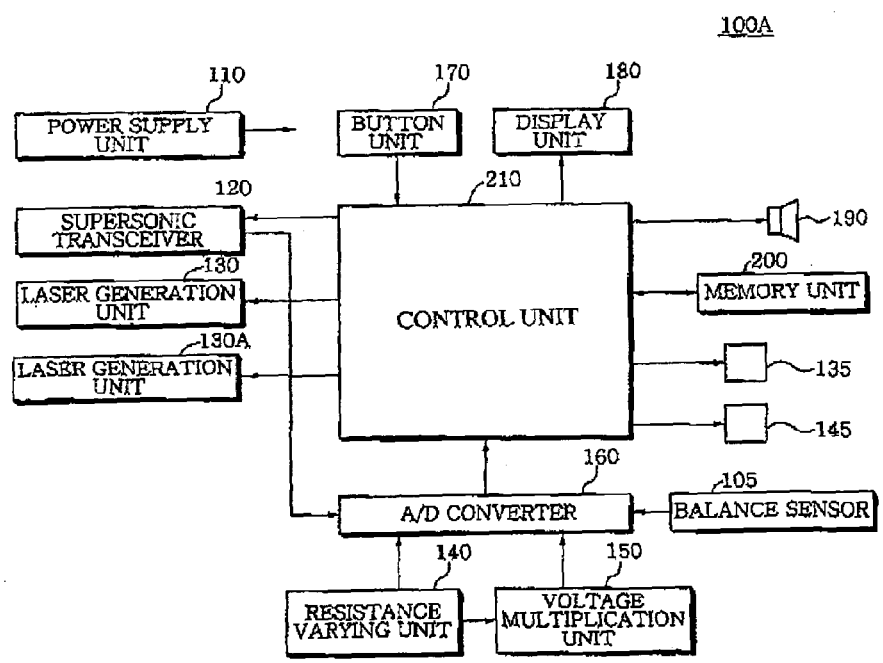
FIG. 10 is a block diagram of the electronic distance measuring apparatus according to the embodiment illustrated in FIG. 8.

FIG. 8 is a perspective view of the appearance of the electronic distance measuring apparatus 100A. FIG. 9 illustrates an example of a balance adjusting structure shown in FIG. 8. FIG. 10 is a block diagram of the electronic distance measuring apparatus 100A according to the embodiment illustrated in FIG. 8.

Referring to FIGS. 8 through 10, the electronic distance measuring apparatus 100A is that same as the electronic distance measuring apparatus 100 according to the embodiment illustrated in FIG. 1, with the exception that it further includes a laser generation unit 130A, a balance sensor 105, a balance state indicator 135, a reference distance indicator 145, and balance adjusting structures 300 and 350 and the position of a supersonic sensor 123A is different from that of the corresponding supersonic sensor 123. Accordingly, the same elements are denoted by the same reference numerals, and the description thereof will be omitted.

The laser generation unit 130A generates a laser beam to point at a reference point of a reference distance (or a reference height) for the measurement using the supersonic transceiver 120. Accordingly, a user can measure a distance to a target object with accurate recognition of the reference point of the reference distance by watching a pointing laser beam generated by the laser generation unit 130A.

The balance sensor 105 is provided to detect a balance state of the electronic distance measuring apparatus 100A. The balance state indicator 135 is controlled by the control unit 210 to indicate that the electronic distance measuring apparatus 100A is in a balanced state according to a balance state signal received from the balance sensor 105 via the A/D converter 160. Here, one balance sensor 105 may be installed with reference to one of x-, y-, and z-axes or a plurality of balance sensors may be installed with reference to the x-, y-, and x-axes, respectively. When the plurality of balance sensors are installed, the control unit 210 controls the balance state indicator 135 to indicate a balanced state when it is determined that a signal received from any one of the plurality of balance sensors indicates the balanced state.

The reference distance indicator 145 is controlled by the control unit 210 to indicate the reference distance when a distance measured by the supersonic transceiver 120 reaches the reference distance. Each of the balance state indicator 135 and the reference distance indicator 145 may be implemented as a light emitting diode.

The balance adjusting structures 300 and 350 are installed at opposite sides, respectively, of the electronic distance measuring apparatus 100A to maintain and adjust the balance thereof.

As shown in FIGS. 8 and 9, the balance adjusting structure 300 is fixed to one side of the electronic distance measuring apparatus 100A and includes a fixing screw 310, a moving portion 320, a stationary portion 330, and a spring 340. The moving portion 320 includes a long hole 323 formed therewithin, an exposed part 321 exposed at one end, a protrusion 324 formed on the other end, and a keeping sill 322 limiting the projection of the exposed part 321. The stationary portion 330 includes guides 331 and 332, which support opposite sides of the moving portion 320 and guide sliding movement, a screw hole 333 at one guide 331, and a spring supporter 335 at a position corresponding to the protrusion 324 of the moving portion 320. One end of the spring 340 is coupled with the protrusion 324 of the moving portion 320 and the other end thereof is coupled with the spring supporter 355 of the stationary portion 330 so that the spring 340 pushes the exposed part 321 of the moving portion 320 outside. The fixing screw 310 engages with the screw hole 333 of the stationary portion 330 to be rotated. When the fixing screw 310 is tightly fastened, the fixing screw 310 closely contacts a side of the moving portion 320 so that the moving portion 320 is fixed. When the fixing screw 310 is loosened, the close contact between the side of the moving portion 320 and the fixing screw 310 is released so that the moving portion 320 becomes movable. A metal piece with a high intensity may be set on the side of the moving portion 320 corresponding to the screw hole 333 of the stationary portion 330 so that the side of the moving portion 320 is not broken when it closely contacts the fixing screw 310 fastened tightly.

The balance adjusting structure 350 is installed at a side opposite to the side of the electronic distance measuring apparatus 100A at which that the balance adjusting structure 300 is installed and includes a though-hole at a portion corresponding to the supersonic sensor 123A. It is preferable that the balance adjusting structures 300 and 350 are designed such that the balance of the electronic distance measuring apparatus 100 is maintained regardless of which side of the electronic distance measuring apparatus 100A is positioned at the bottom. Accordingly, it is preferable that the left side, right side, front side, top side, and bottom side of the balance adjusting structure 350 are plane surface so that balance is maintained. In addition, it is preferable that the right side, rear side, and bottom side of the balance adjusting structure 300 are plane surfaces so that balance is maintained.

Figure 11:
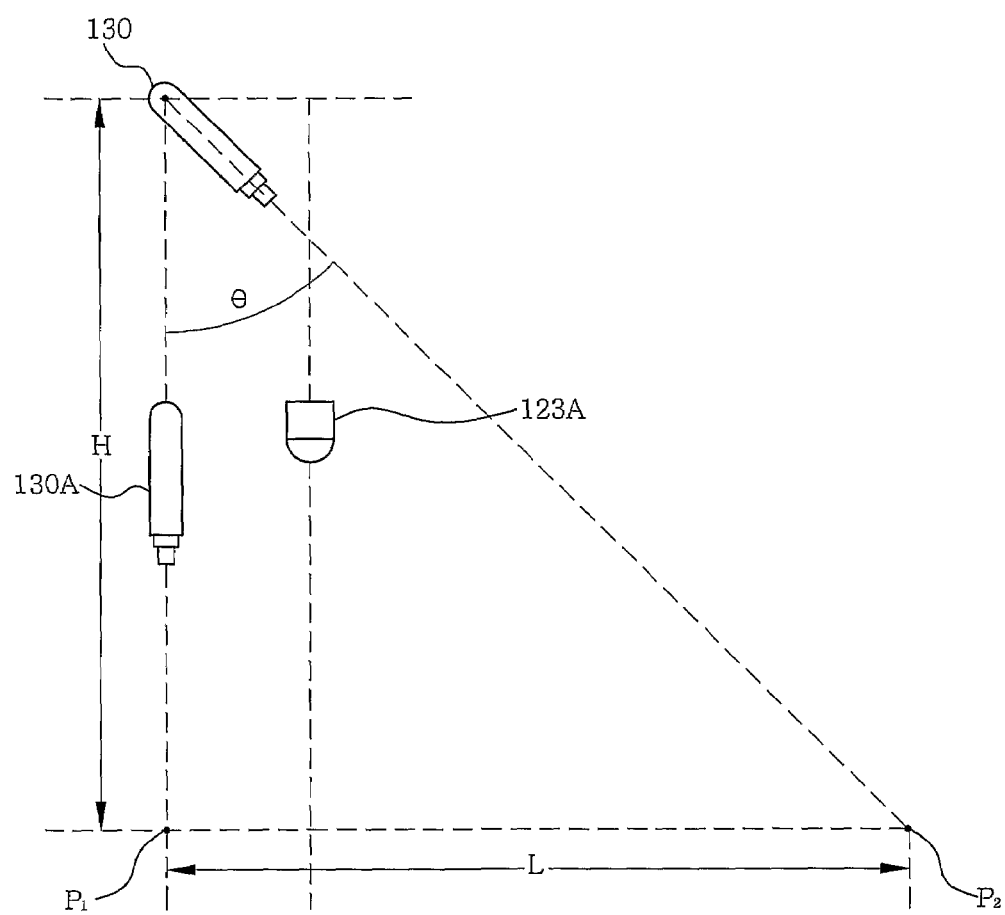
FIG. 11 illustrates the distance measuring principle using the electronic distance measuring apparatus according to the embodiment illustrated in FIG. 8.

FIG. 11 illustrates the distance measuring principle using the electronic distance measuring apparatus 100A, which is substantially the same as the distance measuring principle using the electronic distance measuring apparatus 100, with the following exceptions. The laser generation unit 130A is further provided. The supersonic sensor 123A is fixed so that a transmitter and a receiver thereof are vertical to the ground. The rotation center of the laser generation unit 130 is not on the same line as the supersonic sensor 123A but is on the same line as the laser generation unit 130A. The supersonic sensor 123A is separated from the line, on which the laser generation units 130 and 130A are positioned, by a predetermined distance. Here, like in the electronic distance measuring apparatus 100, the center of the volume key of the resistance varying unit 140 is connected to the rotation center of the laser generation unit 130 via an axis so that the laser generation unit 130 operates together with the volume key of the resistance varying unit 140. The volume key is initially set to a direction vertical to the ground.

In this state, a user makes the right sides of the respective balance adjusting structures 300 and 350 closely contact a reference plane and gradually pushes the exposed part 321. The control unit 210 starts the balance state indicator 135 based on a balance signal received via the A/D converter 160 from the balance sensor 105 at the moment when the electronic distance measuring apparatus 100A is balanced. Accordingly, the user recognizes the balance of the electronic distance measuring apparatus 100A through the balance state indicator 135 when the balance is achieved and tightly fastens the fixing screw 310 at the moment to stop the motion of the moving portion 320 of the balance adjusting structure 300. In a state where the balance has been achieved, the supersonic sensor 123A is operated and a height H from the ground is adjusted. The control unit 210 operates the reference distance indicator 145 and/or the speaker unit 190 based on a reference distance signal received via the A/D converter 160 from the supersonic transceiver 120 when the height H reaches a reference height. Then, the user recognizes through an output of the reference distance indicator 145 and/or speaker unit 190 at the moment when the reference height is reached and maintains the reference height. Here, the height H is standardized to 1.2 m and a distance from the supersonic sensor 123 to the volume key is compensated.

Thereafter, the user rotates the laser generation unit 130 so that a laser beam radiated from the laser generation unit 130 points at a target object. Then, a distance L to be measured corresponds to a distance between a ground position $P_2$ pointed at by the laser beam and a ground point $P_1$ of the electronic distance measuring apparatus 100A.

Here, when a virtual straight line vertical to the ground is connected from the center of the laser generation unit 130A to the rotation center of the laser generation unit 130 and an angle that the laser generation unit 130 rotates from the virtual straight line is represented with θ, Equation (1) is accomplished by the definition of the trigonometric function, as described above.

Accordingly, a distance to a target object that a laser beam of the laser generation unit 130 points at can also be accurately measured using the electronic distance measuring apparatus 100A.

Although the supersonic sensor 123A is separated by the predetermined distance from the line, on which both the laser generation units 130 and 130A are positioned, in the electronic distance measuring apparatus 100A, all of the supersonic sensor 123A and the laser generation units 130 and 130A may be positioned on the same line.

In the embodiments of the present invention, the distance between each of the supersonic sensors 123 and 123A and the ground is limited to 1.2 m. However, a distance measured by the supersonic sensor 123, i.e., a height (or a distance) from the ground, a divided voltage value, and a distance corresponding to the height from the ground and the divided voltage value may be stored in the memory unit 200 in a table form or a special algorithm may be used so that distance measurement can be performed at any height from the ground.

The above description just concerns embodiments of the present invention. The present invention is not restricted to the above embodiments, and various modifications can be made thereto within the scope defined by the attached claims. For example, the shape and structure of each member specified in the embodiments can be changed.

INDUSTRIAL APPLICABILITY

As described above, according to the present invention, a predetermined height is measured using a supersonic sensor and a laser pointer, which has a resistance value varying with the rotation at the predetermined height, is rotated to radiate a laser beam at a target object so that a distance to the target object at which that laser beam is pointing can be accurately measured using the resistance value corresponding to a rotation angle of the laser pointer.

What is claimed is:

1. An apparatus for measuring a distance using a laser beam and a supersonic wave, the apparatus comprising:
   a supersonic transceiver generating and transmitting a supersonic wave according to a control signal received from an outside and receiving the supersonic wave reflected and returning back;
   a laser generation unit generating a laser beam according to a control signal received from the outside;
   a resistance varying unit sensing a rotation of the laser generation unit, varies a resistance value according to an amount of the rotation, and dividing a constant voltage output from a power supply unit;
   a voltage multiplication unit sensing a level of the constant voltage output from the resistance varying unit and multiplying the constant voltage by a predetermined number when the level of the constant voltage is less than a predetermined level;
   an analog-to-digital converter converting an analog signal received from each of the supersonic transceiver, the resistance varying unit, and the voltage multiplication unit into a digital signal;
   a button unit comprising a plurality of buttons for receiving a command from a user;
   a display unit displaying a measured distance;
   a speaker unit generating sound when a distance measured by the supersonic transceiver reaches a reference distance;
   a memory unit storing distance data corresponding to a voltage value output from each of the resistance varying unit and the voltage multiplication unit in a table form; and
   a control unit controlling the speaker unit to generate sound after checking that the reference distance has been reached based on a signal received from the supersonic transceiver via the analog-to-digital converter, reading from the memory unit distance data corresponding to signals received from the resistance varying unit and the voltage multiplication unit via the analog-to-digital converter, controlling the display unit to display the distance data.

2. The apparatus of claim 1, further comprising an additional laser generation unit generating a laser beam pointing at a reference point of the reference distance measured using the supersonic transceiver.

3. The apparatus of claim 1, further comprising:
   a balance sensor detecting a balance state; and
   a balance state indicator indicating a balanced or unbalanced state, wherein the control unit controls the balance state indicator according to a balance state signal received from the balance sensor via the analog-to-digital converter.

4. The apparatus of claim 3, further comprising a balance adjusting structure for adjusting balance of the apparatus.

5. The apparatus of claim 4, wherein the balance adjusting structure comprises:
- a moving portion having a long hole therewithin, an end part exposed outside, a protrusion at an opposite end, and a keeping sill limiting exposure of the end part;
- a stationary portion having guides that support opposite sides, respectively, of the moving portion and guide sliding movement, and a screw hole penetrating one of the guides;
- a spring having an end coupled with the protrusion of the moving portion and an opposite end coupled with the stationary portion, the spring pushing the moving portion outside; and
- a fixing screw engaging with the screw hole of the stationary portion to stop movement of the moving portion.

6. The apparatus of claim 1, wherein the supersonic transceiver comprises:
- a driver switching a control signal of the control unit to generate a driving signal;
a tuning coil tuning the driving signal output from the driver;
- a supersonic sensor generates a supersonic wave in response to the driving signal output from the tuning coil and receiving the supersonic wave reflected and returning back;
- an amplifier amplifying a signal output from the supersonic sensor; and
- a comparator comparing the amplified signal from the amplifier with a reference signal and outputting a signal corresponding to a difference the amplified signal and the reference signal to the analog-to-digital converter.

7. The apparatus of claim 1, wherein the resistance varying unit comprises a volume key that varies the resistance value according to the amount of rotation, the volume key is vertical to the ground and rotates upward less than 85°, and the laser generation unit is installed on a same line and at a same angle as the volume key.

8. The apparatus of claim 1, wherein the distance data corresponding to each voltage value is stored in a centimeter unit in the memory unit, and the memory unit further stores variable data corresponding to a variable value used to convert the centimeter unit to a foot unit in a table form.

9. The apparatus of claim 6, wherein the control unit outputs a driving signal to the driver so that the supersonic sensor generates a supersonic wave, checks a height from the ground to the supersonic sensor using the signal generated by the comparator, controls the speaker unit to generate sound when the height is the same as the reference distance, searches the memory unit for a distance corresponding to a voltage value received from one of the resistance varying unit and the voltage multiplication unit via the analog-to-digital converter after the laser generation unit has been rotated and the divided resistance value of the resistance varying unit has been varied according to an angle of the rotation, and performs control to display the searched distance in one of a centimeter unit and a foot unit according to the user's selection.

10. The apparatus of claim 8, wherein when the resistance varying unit rotates greater than a predetermined angle, a resistance value is low, and thus the constant voltage is higher than a predetermined level, the control unit interrupts the signal received from the resistance varying unit and senses the voltage received from the voltage multiplication unit.

11. The apparatus of claim 1, wherein the voltage multiplication unit comprises:
- a zener diode having a cathode connected to a node connecting the resistance varying unit and the control unit, the zener diode being turned ON when the constant voltage output from the resistance varying unit is greater than a breakdown voltage when the laser generation unit rotates more than a predetermined angle because a distance to be measured is farther than a predetermined distance; and
- a voltage multiplier having a non-inverting terminal connected to an anode of the zener diode and an inverting terminal connected to the power supply unit, the voltage multiplier comparing an input voltage with a reference voltage, multiplying a difference therebetween, and outputting a result of the multiplication to the analog-to-digital converter.

12. The apparatus of claim 8, wherein the reference distance is set to a height of 1.1-1.3 m, at which the user can easily use the apparatus while carrying it.

* * * * *